April 13, 1965  E. C. RYAN ETAL  3,177,570
APPARATUS FOR MANUFACTURING INSULATOR PINS
Original Filed Aug. 15, 1960  3 Sheets-Sheet 1

INVENTOR.
EDMUND C. RYAN
BY LESTER R. WENDLAND
ATTORNEY

INVENTOR.
EDMUND C. RYAN
BY LESTER R. WENDLAND

ATTORNEY

April 13, 1965   E. C. RYAN ETAL   3,177,570
APPARATUS FOR MANUFACTURING INSULATOR PINS
Original Filed Aug. 15, 1960                 3 Sheets-Sheet 3
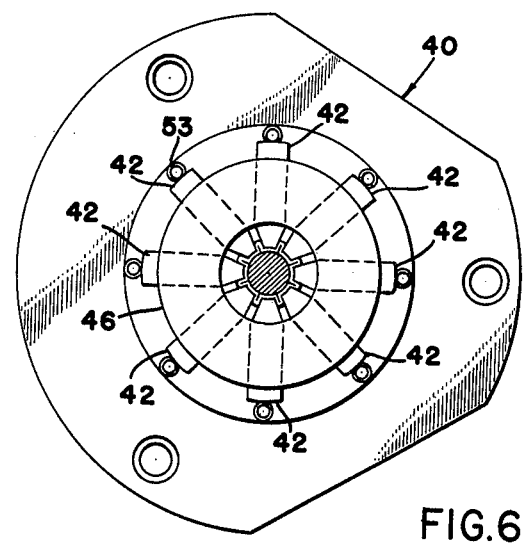
FIG.6
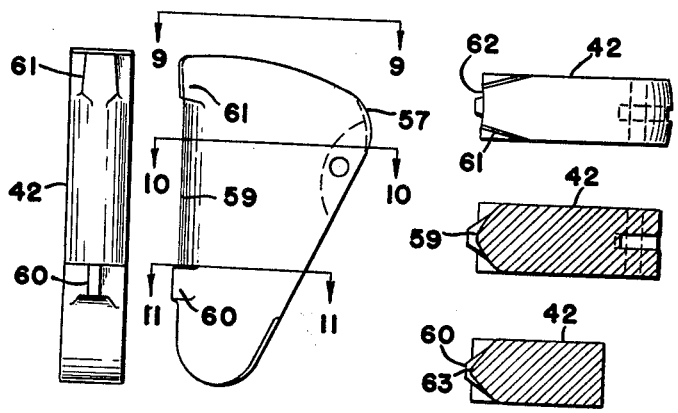
FIG.8   FIG.7
FIG.9
FIG.10
FIG.11
INVENTOR.
EDMUND C. RYAN
BY LESTER R. WENDLAND
ATTORNEY

United States Patent Office 3,177,570
Patented Apr. 13, 1965

3,177,570
APPARATUS FOR MANUFACTURING
INSULATOR PINS
Edmund C. Ryan and Lester R. Wendland, Mansfield,
Ohio, assignors to The Ohio Brass Company, Mansfield,
Ohio, a corporation of New Jersey
Original application Aug. 15, 1960, Ser. No. 49,596, now
Patent No. 3,114,000, dated Dec. 10, 1963. Divided
and this application Feb. 11, 1963, Ser. No. 257,524
7 Claims. (Cl. 29—243.52)

This invention relates to pins and sleeves for suspension insulators and to apparatus for the manufacture thereof.

This application is a division of application Serial No. 49,596, filed August 15, 1960, by Edmund C. Ryan and Lester R. Wendland, which is now United States Patent 3,114,000, issued December 10, 1963.

Application Serial No. 48,232, filed August 8, 1960, by J. J. Taylor et al., describes an improved insulator in which the suspension pin is shielded by a metal sleeve. The sleeve is disposed about the shank of the pin and extends from adjacent the head of the pin to a point along the shank and beyond the exterior surface of the body of cement which secures the pin in the bell of the insulator body. The metal sleeve separates the cement body from the shank of the pin and sleeve to prevent corrosive attack upon the shank of the pin and, additionally, to prevent cracking of the insulator by reason of the growth of the products of corrosion in the region along the adjoining surfaces of the concrete and the sleeve.

The structural arrangement necessary in a pin and sleeve arrangement of the types described in United States Patent 2,443,435 and in the J. J. Taylor et al. application above referred to are as follows: first, the sleeve must be rigidly attached to the pin; and secondly, the inward deformation of the sleeve under conditions of corrosive growth should, preferably, be facilitated by corrugation of the sleeve, at least along its outer extremity. The first of these conditions imposes difficult manufacturing requirements, particularly in the improved insulator of the J. J. Taylor et al. application above referred to wherein a conical sleeve is attached to the pin at its smaller end. Specifically, the pin is most economically formed by upsetting or forging operations and the sleeve must be attached to a shoulder on the pin which is of lesser diameter than the ball or head of the pin.

In accordance with the present invention, the sleeve is formed from a blank constituted by a length of cylindrical metal tubing having an inside diameter greater than the outside diameter of the ball of the pin. The cylindrical blank is positioned over the shank of the pin and then formed as a conical piece by crimping one end of the blank inward into engagement with the shoulder at discrete intervals about the circumference of the shoulder. The intervening portions of the cylindrical blank are folded together as radial projections with the co-extending walls in contact or closely spaced. The inward movement of the metal of the cylindrical blank is accomplished so that the longitudinal convolutions of the blank are transformed from the discrete segments and radial projections at the shoulder to depressions and ridges at the exterior end of the blank so as to constitute longitudinal corrugations circumferentially arranged at the exterior end of the sleeve. The end of the sleeve abuts the head of the pin at the juncture of the head with the shoulder so that the sleeve is rigidly held against the shoulder of the pin.

The pin and sleeve are cleaned and then galvanized by dipping in molten zinc. The zinc closes all the crevices and apertures between the sleeve and the pin and, additionally, the spaces between the walls of the radial projections of the sleeve. In addition to its function as a protective coating, the zinc serves to bond the sleeve to the pin and the co-extensive portions of the radial projections of the sleeve to assist in maintaining the compressive engagement of the sleeve with the shoulder of the pin.

The invention will be more fully understood by reference to the following detailed specification and claims taken in connection with the appended drawings, in which:

FIG. 6 is a horizontal section view, partly broken away, taken in the direction 6—6 in FIG. 5; and FIGS. 7 to 11, inclusive, show the shape and design of a finger of the die shown in FIG. 5.

Figure 1:
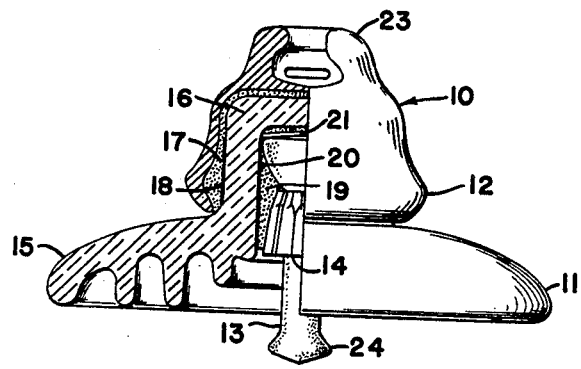
FIG. 1 is a side elevation view, partly in section and partly broken away, of a suspension insulator illustrating the invention.

Referring now to FIG. 1, there is shown a suspension insulator 10 comprising an insulator body 11, a cap 12, pin 13 and sleeve 14. The insulator body 11 is constituted of a vitreous electrical insulating material, usually porcelain, shaped as a disc 15, a central part or bell 16, and skirts on the under part of the disc 15. The cap 12 is secured to the exterior of the bell 16 by a body 17 of Portland cement and a coating 18 constituted by sand particles embedded in a layer of glaze which extends around the exterior of the bell 16. The pin 13 and sleeve 14 are held in the open interior of the bell 16 by a body 19 of Portland cement and a coating 20 constituted by particles of sand embedded in a layer of glaze which extends peripherally about the interior of the bell. A pad 21 of felted paper extends across the top of the head of the pin 13 and the exterior surface of the head of the pin 13 and the exterior surface of the head is covered with a coat of asphalt for reasons not particularly related to the present invention. The cap is formed as a socket 23 at the outer end thereof and the pin 13 is formed as a ball 24 at the outer end thereof to connect the insulator 10 to ancillary suspension and strain apparatus.

Figures 2, 3, 4:
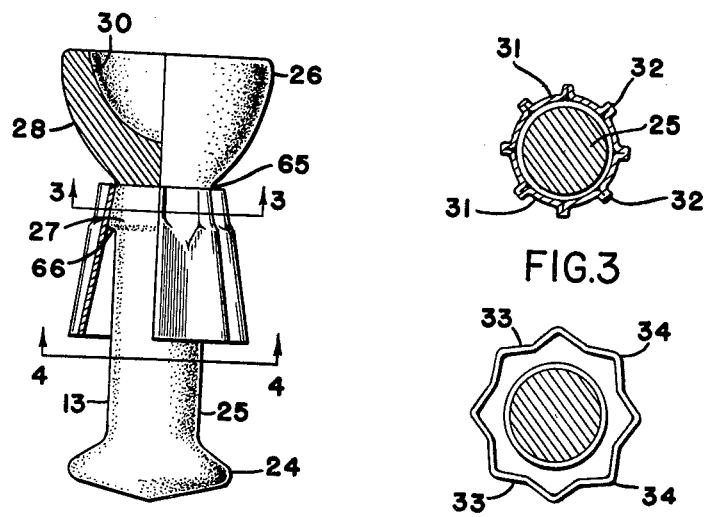
FIG. 2 is a side elevation view of the suspension pin and sleeve of the insulator of FIG. 1, also partly in section.
FIG. 3 is a section view of the pin and sleeve of FIG. 2 taken along the line 3—3 of FIG. 2.
FIG. 4 is a view, partly in section, of the pin and sleeve of FIG. 2, taken along the line 4—4 in FIG. 2.

The present invention is concerned with the organization of the pin 13 and the sleeve 14. As is shown in FIG. 2, the pin 13 is constituted by an elongated shank 25 having the ball 24 constituted as an integral enlargement at one end and a head 26 constituted as an integral enlargement at the remaining end thereof. A shoulder 27 is constituted as an integral enlargement of the shank 25, adjacent the head 26, and has a lesser diameter than the head 24. The shoulder 27 has a flat conical surface which tapers inwardly in the direction of the head 26 and terminates at the exterior surface 28 of the head 26.

The ball 24, shank 25, head 26 and shoulder 27 are of circular cross-section, being symmetrical about the longitudinal axis of the pin. The exterior surface 28 is constituted with a spherical contour, referred to as a spheroidal surface. The term spheroidal surface, as used herein, denotes any surface having a substantially spherical contour with the center of curvature on the longitudinal axis of the pin or offset therefrom.

The pin 13 is made conveniently from bar stock by upsetting or forging operations. The opening 30 is convenient in certain forms of making, but otherwise not a necessary part of the pin. The pin is made of medium carbon or alloy steel although non-ferrous alloys or stainless steel may be used.

The sleeve 14 is constituted of sheet metal and having a generally conical shape and disposition. The sleeve has a plurality of discrete conical segments 31 which conform to and are engaged with the conical outer surface of the shoulder 27 of the pin 13. The conical segments 31 extend throughout the length of the sleeve from one end to the other and are connected by radially extending projections 32 which are formed by folded portions of the sheet material of the sleeve. The radial projections 32 are produced as a result of the forming operation of the sleeve 14, but also function, in part, as a holding means for attaching the sleeve 14 to the shoulder 27.

According to the invention, manufacture of the sleeve in the form shown is accomplished by providing a tubular metal blank constituted by a length of cylindrical metal tubing with an inside diameter greater than the outside diameter of the ball 24, relatively positioning the blank and the pin with the blank over the shank, and forming the blank into the desirable conical shape with the smaller end of the sleeve in engagement with the shoulder 27 while the blank is so positioned. Manufacture is facilitated by use of the apparatus shown in FIGS. 5 and 6.

Figure 5:
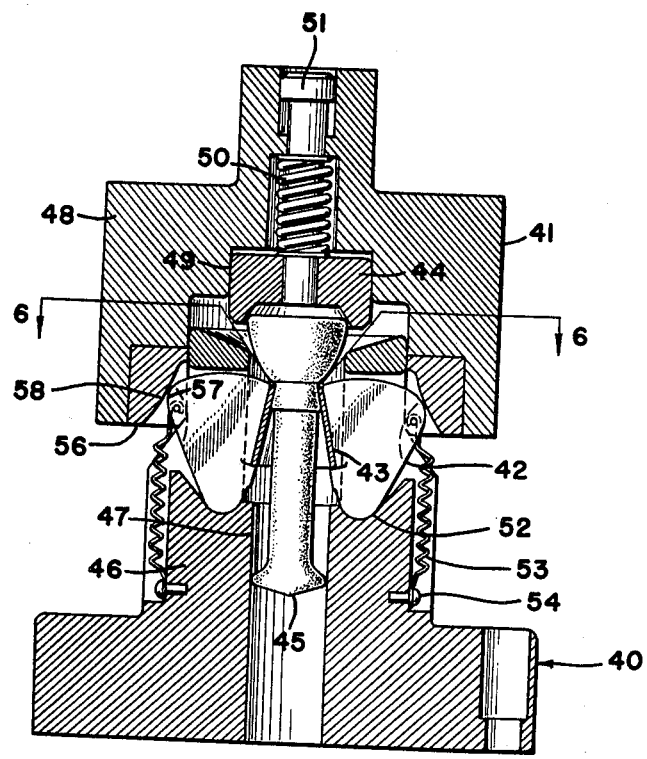
FIG. 5 is an elevation view of apparatus for automatically forming the sleeve and for assembling the sleeve on the pin, in accordance with the invention.

Referring now to FIGS. 5 and 6, the apparatus therein shown comprises a bottom die 40, a top die 41, a plurality of fingers 42 for holding a sleeve 43, and a receiver 44 for holding a pin 45.

The bottom die 40 includes a base, a generally cylindrical upright 46 having an opening 47 in which the pin 45 is received. The receiver 44 is carried by the body 48 of the top die 41 and slides in an opening 49 against the spring 50. A piece 51 functions as a slide for the receiver 44 as well as a limit stop for the spring 50. The receiver 44 is normally held in the fully extended position by the spring 50 and is compressed by engagement with the end of the pin 45 as the dies 40 and 41 are moved together.

The upright 46 of the bottom die 40 carries the fingers 42 in a plurality of radially extending openings arranged at equally spaced intervals around the part. Each opening extends through the wall of the upright 46 and each of the fingers is received in a circularly shaped depression 52 which conforms to a circular end part of the finger for pivotal movement thereof. Each of the fingers 42 is restrained by an elastic spring 53 which is connected to the upright 46 by a screw 54 and to the finger 42 by a pin 55 (FIG. 10).

The dies 40 and 41 are mounted in a hydraulic press which moves the top die 41 toward the bottom die 40 in alignment therewith and at the requisite pressures. The fingers 42 are actuated by engagement of an insert 56, carried by the body 48 of the top die 41, with the outer face 57 of each of the fingers 42 along the surface 58 of the insert. The insert 56 is made of hard material, or is suitably face hardened with the faces 57 of the fingers 42, to prevent undue wear of the engaging parts.

Each of the fingers 42 is formed at the lower extremity of the inner face 59 thereof with a projection 60 which serves to support and hold the sleeve blank 43. The open position of the fingers 42 is such that the faces 59 extend in parallel directions along the exterior of the blank, so that the projections 60 of the several fingers engage the bottom end of the blank.

Each of the fingers 42 is formed adjacent the top extremity with a projection 61 from the inner face 59 of the finger. The projection 61 has a front face 62 which is formed as a circular arc having a radius equal to that of the outer surface of the sleeve 14 and so disposed that, with the finger 42 in the final position, the face 62 is centered on the longitudinal axis of the pin. Accordingly, during inward movement of the fingers 42, the projections 61 force the body of the tubular blank inward into contacting relationship with the exterior surface of the shoulder 27 to form the discrete portions 31 of the sleeve 14. The intervening portions of the blank are folded between the fingers to constitute the radial projections 32 of the sleeve 14, as is shown in FIG. 6.

The inner faces 56 of the fingers 42 are shaped to form the longitudinally extending convolutions in the blank which constitute, at the outer end of the sleeve 14, the corrugations shown in FIG. 4. As will be evident from a consideration of FIGS. 9, 10 and 11, the change in the shape of the finger from the concave face 62 at the projection 61 to the convex face 63 to the projection 60, together with the circumferential spacing of the fingers produces in the formed sleeve a gradual transition from the segments 31 (FIG. 3) to the concave convolutions 33 (FIG. 4), and from the radial projections 32 (FIG. 3) to the convex convolutions 34 (FIG. 4).

In manufacture, the tubular blank 43 is placed between the fingers 42 so that the blank rests at its lower end upon the projection 57 of each of the fingers. The pin 45 is then inserted through the blank so that the head of the pin rests upon and is supported by the blank at the upper end of the blank. The inward movement of the fingers 42 as a result of the downward movement of the top die 41 toward the bottom die 40 compresses the blank inward in the radial direction of the movement of several fingers. The inward movement of the blank simultaneously forces the pin 45 in the upward direction, with movement of the inner edge of the blank along the spherical surface (corresponding to the surface 28 of the pin 13) of the head of the pin 45, until the head of the pin engages the receiver 44. The force exerted by the spring 50, through the receiver 44, on the end of the pin, opposes the inward movement of the end of the sleeve 43 such that the inside edges of the end of the blank are in substantial engagement with the pin at the juncture of the exterior surface of the head of the pin with the exterior surface of the shoulder when the inwardly deformed portions of the tubular blank are in contacting engagement with the conical surface of the shoulder (that is, along the discrete conical portions 31 indicated in FIG. 3). Accordingly, a mechanical joint is formed between the sleeve and the pin as the fingers 42 are brought to a fully closed position (indicated in FIG. 5). The shaping of the blank along the length to produce the convolutions of the sleeve 14 is, of course, accomplished during the inward movement of the fingers 42 as heretofore described.

It is to be understood that the foregoing description is not intended to restrict the scope of the invention and that various rearrangements of the parts and modifications of the design may be resorted to. The following claims are directed to combinations of elements which embody the invention or inventions of this application.

We claim:
1. Apparatus for assembling a pin and sleeve in which the sleeve is formed from a tubular metal blank and attached at one end thereof to the pin, comprising a first die having a base and an upright, a plurality of radially extending fingers carried in openings extending radially through the upright, the fingers being located at circumferentially spaced intervals about a central longitudinal opening in the upright and having projections from interior faces thereof for carrying the blank in the open position of the fingers, a second die having an annular part thereof arranged for movement over the outside of the said upright and engagement with exterior shoulders of the said fingers to move the fingers radially inward and thereby crimp the one end of the tubular blank inward into engagement with the pin along circumferential portions thereof.

2. Apparatus for assembling a pin and sleeve in which the sleeve is formed from a cylindrical metal blank comprising a first die having a base and a cylindrical upright, a plurality of fingers carried in openings extending radially through the upright, the fingers being located at circumferentially spaced positions about a central longitudinal opening in the upright and pivoted on the said upright at one end thereof adjacent the base, projections on the interior faces of the fingers adjacent the said one end thereof for carrying the blank in the open position of the fingers, a second die movable over the upright at the end thereof away from the base and having a tapered interior surface for engagement with outwardly projecting portions of the fingers, at the remaining end thereof, to move the said remaining ends of the fingers radially inward and thereby deform the blank radially inward at the end thereof away from the base of the first die and into engagement with the pin along circumferential portions thereof, while forming a generally conical sleeve.

3. Apparatus in accordance with claim 2, in which the second die is provided with a spring pressed receiver which engages the end of the pin during movement of the second die toward the first die for longitudinally positioning the pin while the fingers are moved inward.

4. Apparatus in accordance with claim 2, in which the inner faces of the fingers are configured with concave faces adjacent the said remaining end of the fingers, which transform into a convex face adjacent the projection at the said one end of the finger to form a sleeve with longitudinally extending convolutions during inward movement of the fingers.

5. Apparatus for compressively assembling a tubular part on another part, comprising a first die, a plurality of radially extending fingers carried in openings extending radially through the die, the fingers being located at circumferentially spaced intervals about a central longitudinal opening in the die and having projections from interior faces thereof for carrying the blank in the open position of the fingers, and a second die having an annular part thereof arranged over the outside of the first die for engagement with exterior shoulders of the fingers to move the fingers radially inward upon relative movement together of the dies and thereby crimp the one end of the tubular blank inward into engagement with the said other part along circumferential portions thereof.

6. Apparatus for compressively assembling a sleeve on another part, in which the sleeve is formed from a cylindrical metal blank, comprising a first die, a plurality of fingers carried in openings extending radially through the first die, the fingers being located at circumferentially spaced positions about a central longitudinal opening in the die and being pivoted on the said die at one end thereof, projections on the interior faces of the fingers adjacent the said one end thereof for carrying the blank in the open position of the fingers, a second die, relatively movable with respect to the first die, and having a tapered interior surface for engagement with outwardly projecting portions of the fingers at the remaining ends thereof to move the said remaining ends of the fingers radially inward upon relative movement together of the dies and thereby deform the blank radially inward and into engagement with the said other part along circumferential portions thereof.

7. Apparatus for compressively assembling a sleeve on another part, in which a conical sleeve is formed from a cylindrical metal blank, comprising a first die, a plurality of fingers carried in openings extending radially through the first die, the fingers being located at circumferentially spaced positions about a central longitudinal opening in the die and being pivoted on the said die at one end thereof, means for supporting the blank coaxially between the fingers, a second die, relatively movable with respect to the first die and having a tapered interior surface for engagement with outwardly projecting portions of the fingers at the remaining ends thereof to move the said remaining ends of the fingers radially inward upon relative movement together of the dies and thereby deform the blank radially inward and into engagement with the said other part along circumferential portions thereof while imparting a conical disposition to the blank in contact with the said other part adjacent the said remaining ends of the fingers and with radially extending convolutions between the fingers.

References Cited by the Examiner
UNITED STATES PATENTS

| 116,012 | 6/71 | Beecher | 153—12 |
| 1,111,403 | 9/14 | Ohl | 153—33 |
| 2,311,662 | 2/43 | Hunziker. | |
| 2,689,400 | 9/54 | Mirando. | |
| 2,838,789 | 6/58 | Pazandak. | |
| 3,093,182 | 6/63 | Vanderhoof | 153—1 |

CHARLES W. LANHAM, *Primary Examiner.*
WILLIAM J. STEPHENSON, *Examiner.*